United States Patent
Villemagne et al.

(10) Patent No.: US 9,441,669 B2
(45) Date of Patent: Sep. 13, 2016

(54) GUIDING BODY IN THE FORM OF A RING FOR FRICTION MOUNTING, WITH AN ARTICULATING AND/OR ELEMENT-SLIDING CAPACITY

(71) Applicant: H.E.F., Andrezieux Boutheon (FR)

(72) Inventors: Patrick Villemagne, Saint-etienne (FR); Georges Godard, Saint-germain-laval (FR)

(73) Assignee: H.E.F., Andrezieux Boutheon (FR)

( * ) Notice: Subject to any disclaimer, the term of this patent is extended or adjusted under 35 U.S.C. 154(b) by 0 days.

(21) Appl. No.: 14/649,416

(22) PCT Filed: Dec. 6, 2013

(86) PCT No.: PCT/FR2013/052966
§ 371 (c)(1),
(2) Date: Jun. 3, 2015

(87) PCT Pub. No.: WO2014/091124
PCT Pub. Date: Jun. 19, 2014

(65) Prior Publication Data
US 2015/0323005 A1 Nov. 12, 2015

(30) Foreign Application Priority Data
Dec. 13, 2012 (FR) ..................... 12 61988

(51) Int. Cl.
*F16C 33/10* (2006.01)
*F16C 33/04* (2006.01)
*F16C 17/02* (2006.01)
*F16C 3/02* (2006.01)

(52) U.S. Cl.
CPC ................ *F16C 33/04* (2013.01); *F16C 3/02* (2013.01); *F16C 17/02* (2013.01); *F16C 33/102* (2013.01)

(58) Field of Classification Search
CPC .............. F16C 33/1055; F16C 33/106; F16C 33/1065; F16C 33/1085; F16C 33/102
USPC ........ 384/291, 292, 385, 389, 397–399, 293
See application file for complete search history.

(56) References Cited

U.S. PATENT DOCUMENTS

| | | | | |
|---|---|---|---|---|
| 1,856,304 | A | * 5/1932 | Whiteley | ............ F16C 33/1065 384/291 |
| 2,616,771 | A | * 11/1952 | Metzgar | ................ F16C 17/026 384/291 |
| 4,201,176 | A | 5/1980 | Lustgarten | |
| 6,729,763 | B2 | * 5/2004 | Post | .................... F16C 33/1065 384/213 |

(Continued)

FOREIGN PATENT DOCUMENTS

| | | |
|---|---|---|
| DE | 84 06 459 U1 | 6/1986 |
| FR | 738 343 A | 12/1932 |

(Continued)

OTHER PUBLICATIONS

International Search Report for International Application No. PCT/FR2013/052966, dated Mar. 7, 2014.

*Primary Examiner* — Phillip A Johnson
(74) *Attorney, Agent, or Firm* — Heslin Rothenberg Farley & Mesiti P.C.

(57) ABSTRACT

The ring or the component have workings to supply grease to the friction area at given time intervals, with the bore of the ring having workings able to act as a grease reserve. The ring's bore has facilities suitable for putting the grease supply workings in communication with all the workings suitable to act as a grease reserve.

5 Claims, 2 Drawing Sheets

(56) References Cited

U.S. PATENT DOCUMENTS

2003/0190102 A1* 10/2003 Horng ................ F16C 33/1065
                                                        384/292
2004/0042698 A1    3/2004 Yamamoto et al.

FOREIGN PATENT DOCUMENTS

| FR | 1 019 801 A | 1/1953 |
| FR | 2 376 330 A1 | 7/1978 |
| GB | 671769 A | 5/1952 |

* cited by examiner

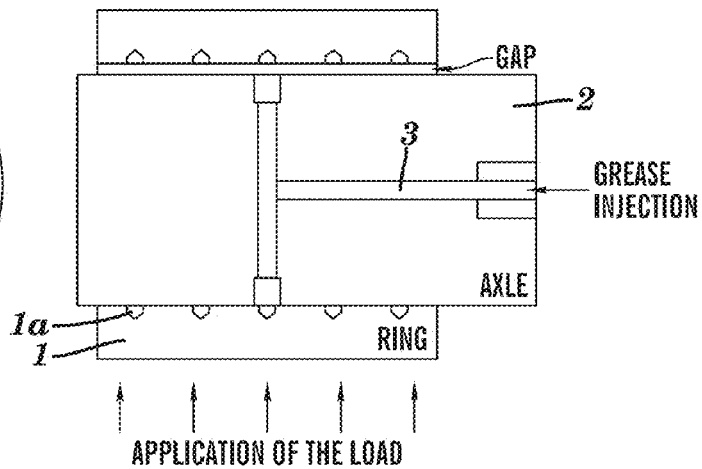
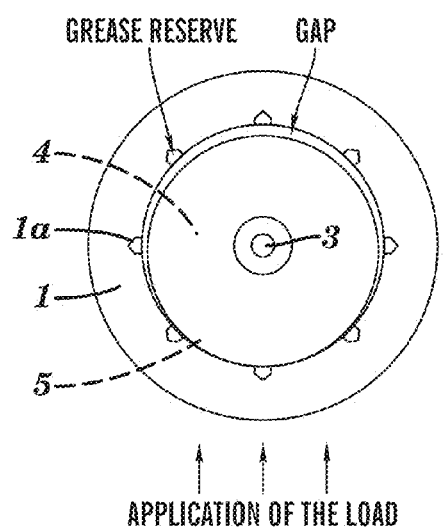
FIG. 2  FIG. 1
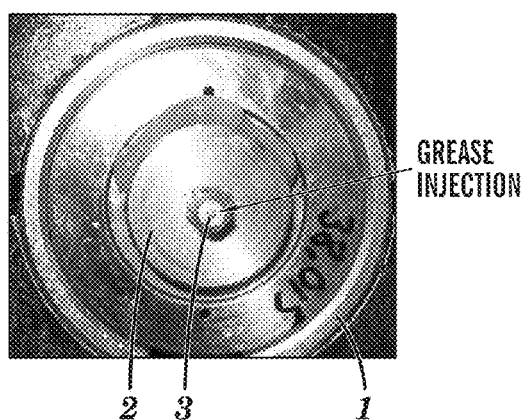
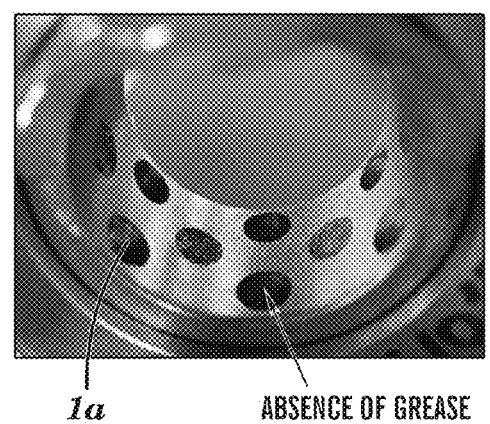
FIG. 3  FIG. 4

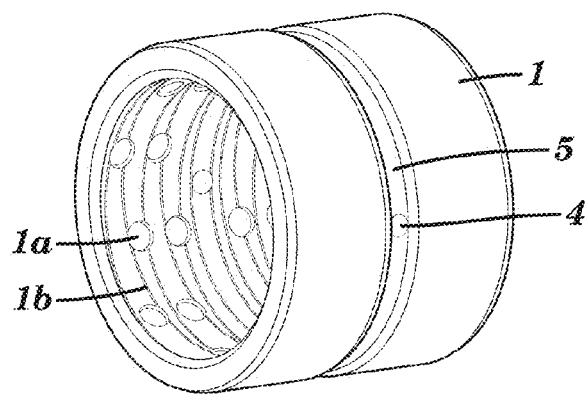
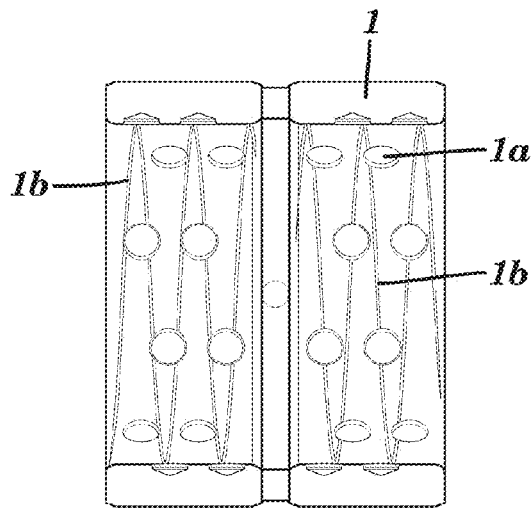
FIG. 5
FIG. 6
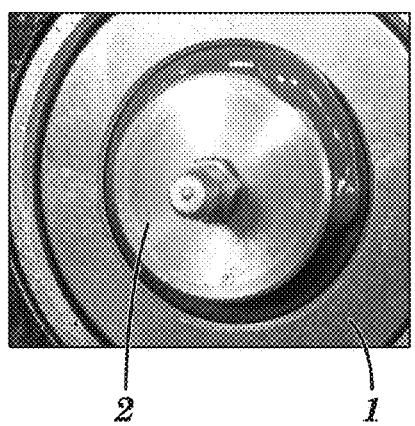
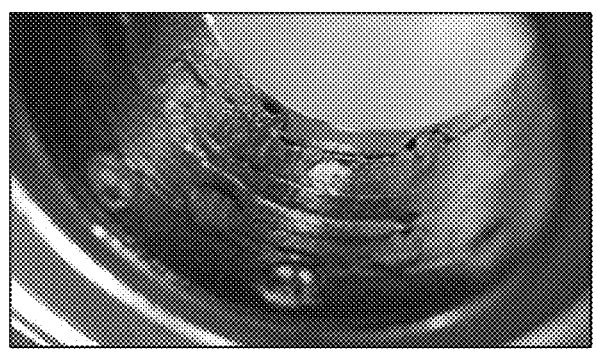
FIG. 7
FIG. 8

GUIDING BODY IN THE FORM OF A RING FOR FRICTION MOUNTING, WITH AN ARTICULATING AND/OR ELEMENT-SLIDING CAPACITY

CROSS REFERENCE RELATED APPLICATIONS

This application is a national stage filing under section 371 of International Application No. PCT/FR2013/052966, filed on Dec. 6, 2013, and published in French on Jun. 19, 2014, as WO2014/091124 A1 and claims priority of French application 1261988 filed on Dec. 13, 2012, the entire disclosure of these applications being hereby incorporated herein by reference.

BACKGROUND ART

The invention concerns the technical domain of articulations of ring, rotary or slide type, with workings suitable to set as a grease reserve in order to lengthen the intervals of time at which greasing must be performed.

More particularly, the invention concerns all types of pivots and slides requiring periodic lubrication to improve the friction and slide between two parts that have a movement relative to each other.

Such is the case, for example, with a guidance device in ring form for assembly with a capacity for articulation and/or sliding of a component such as a shaft or pin.

The workings suitable to act as a grease reserve at the bore of the ring can be composed of holes, cells, grooves, etc.

Also note that still in a known manner, the ring or the pin can have workings to feed grease, at given time intervals, to the friction area and, more particularly, the workings suitable to act as a grease reserve.

In effect, it has been observed that, during a standard lubrication, there is a renewal of grease in the operating play, hot this renewal in the workings under load is only partial and uncontrolled in the case of major oscillations, and non-existent in the case of weak oscillations.

According to the state of the art, to remedy this disadvantage, it is necessary to undertake a very heavy maintenance operation that requires the dismounting of parts, in order to perform a manual lubrication, and then to remount the said parts.

This operation of dismounting of opposing parts is long, costly and involves a risk of damage to fee various component parts of the joint in question.

As a result of this, lubrication is very often delayed, which is detrimental to the satisfactory operation of the assembly.

The invention is intended to remedy these disadvantages in a simple, safe, effective and rational manner.

BRIEF SUMMARY OF THE INVENTION

The problem that the invention is designed to solve is to be able to resupply grease to the workings suitable to act as a grease reserve and located under the load; the problem does not exist for workings located away from the load, because they can be resupplied with grease.

The invention has an advantageous application in the case of a guidance device in the form of a ring for mounting of a component with friction and with articulation and/or sliding ability, with the said ring or component having workings to supply grease to the friction area, at given time intervals, and with the bore of the rings having workings suitable to act as as grease reserve.

According to the invention, given the problem to be resolved, the ring's bore has facilities suitable for putting the grease supply workings in communication with all the workings suitable to act as a grease reserve.

These characteristics provide the possibility of resupplying the workings acting as grease reserve without dismounting the components of the entire articulation in question.

According to another characteristic, the facilities consist of channels connecting each of the workings suitable to act as a grease reserve.

In one implementation, the channels are arranged in a helix.

According to another characteristic, the workings suitable to act as a grease reserve consist of notes of cavities, or of grooves.

The grease supply workings are composed of an external peripheral groove formed on one part of the component and opening into the bore of the ring, with the said groove being in communication with a grease injection system.

BRIEF DESCRIPTION OF THE DRAWING FIGURES

The invention will be explained below in more detail, with the aid of the appended drawings, in which:

FIG. 1 is a longitudinal cross section of a guidance device in ring form for mounting of a pin-type component with friction, with the ring having workings suitable to act as a grease reserve, while the pin has workings for the injection of the grease at the friction area, including into the workings suitable to act as a grease reserve;

FIG. 2 is a side view corresponding to FIG. 1;

FIGS. 3 and 4 are photographs illustrating the lubrication performed by an injection through the center of the pin, according to the state of tire art;

FIG. 5 is a view in perspective of the ring, in accordance with the characteristics of the invention;

FIG. 6 is a longitudinal cross section of the ring, in accordance with FIG. 5;

FIGS. 7 and 8 are photographs similar to FIGS. 3 and 4, in accordance with the characteristics of the invention.

DETAILED DESCRIPTION

FIGS. 1 and 2 illustrate a guidance device in the form of a ring (1), for mounting of a component (2)—such as a pits, for example—with friction and with articulation and sliding capability.

The ring (1)—notably its bore—has workings (1*a*) in the form of holes, cavities or grooves, for example, suitable to act as a grease reserve.

The pin (2) or ring (1) has workings to supply grease to the friction area, including the workings (1*a*), at given time intervals.

In the example illustrated in FIGS. 1 and 2, the workings for the injection of the grease consist of a coaxial channel (3) for the injection of the grease from the exterior in communication with the radial channels (4) opening into a groove (5) its communication with the bore of the ring (1). Such arrangements are stated as examples perfectly known to a professional in the field concerned.

As stated, the radial channels (4) are in communication with the outside peripheral groove (5) on the pin (2), which opens into the bore of the ring (1).

As stated in the analysis of the state of the art, it will be remembered that during a lubrication performed via the center of the pin, a certain quantity of the grease injected exits via the play existing between the pin (2) and the ring (1). However, at the bottom part, which corresponds to the application of the load (symbolized by arrows at FIGS. 1 and 2), the grease does not overflow.

Similarly, one can observe., after dismounting the pin. (FIG. 4) that, alter this lubrication operation, there is no grease in the area located under the load, as specified, and notably the working acting as a grease reserve.

According to a fundamental characteristic of the invention, to overcome this disadvantage, the bore of the ring (1) has facilities (1b) able to put the lubrication workings (4-5) and workings (1a) suitable to act as a grease reserve in communication, wife the effect of supplying ail the grease reserve workings, including those located under the load.

As shown in Figures 5 and 6, the facilities (1b) consist of channels connecting each of the workings (1a) suitable to act as a grease reserve.

The channels (1b) are advantageously positioned as a helix, so as to supply all the grease reserve workings, including those positioned under the load.

Given these characteristics, there is a continuity between the lubrication groove (5) and the workings (1a) suitable to act as a grease reserve by means of irrigation channels (1b). Refer to the photos in FIGS. 7 and 8, which show that the grease overflows, including under the load (FIG. 7) and in the workings (1a) which act as a grease reserve, positioned trader the said load (FIG. 8).

The advantages come to the fore clearly in the description; in particular, the possibility of resupplying the workings acting as a grease reserve without requiring the dismounting of the various components of the entire articulation.

The invention claimed is:

1. Guidance device comprising a ring for mounting of a component, with friction and with articulation and/or sliding capability, with the ring or the component having workings to supply grease to a friction area at given time intervals, with an interior surface of a bore of the ring having multiple spaced-apart workings acting as a grease reserve, wherein the bore of the ring has facilities to put the grease supply workings in communication with all of the workings acting as the grease reserve, including workings acting as the grease reserve located under an applied load, wherein the facilities comprise channels connecting each of the workings acting as the grease reserve, and wherein the channels are positioned in a helix.

2. The guidance device according to claim 1, wherein the workings acting as the grease reserve are composed of holes or cavities.

3. The guidance device according to claim 1, wherein the workings acting as the grease reserve are composed of grooves.

4. The guidance device according to claim 1, wherein the grease supply workings are composed of an external peripheral groove formed on one part of the component and opening into the bore of the ring, with the groove being in communication with a grease injection system.

5. Guidance device comprising a ring for mounting of a component, with friction and with articulation and/or sliding capability, with the ring or the component having workings to supply grease to a friction area at given time intervals, with an interior surface of a bore of the ring having multiple spaced-apart workings acting as a grease reserve, wherein the bore of the ring has facilities to put the grease supply workings in communication with all of the workings acting as the grease reserve, including workings acting as the grease reserve located under an applied load, and wherein the grease supply workings are composed of an external peripheral groove formed on one part of the component and opening into the bore of the ring, with the groove being in communication with a grease injection system.

\* \* \* \* \*